Patented Apr. 13, 1926.

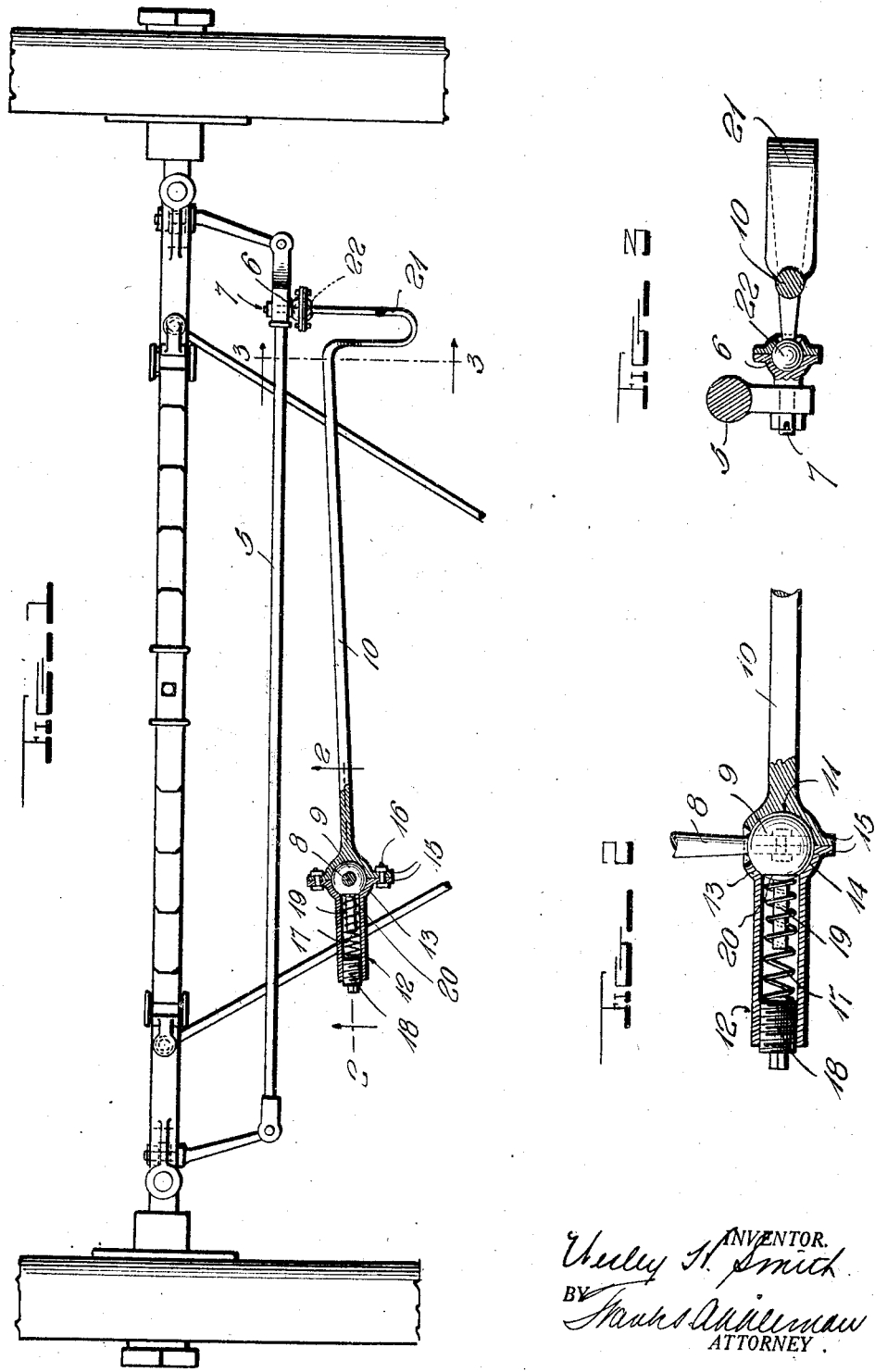

1,581,032

UNITED STATES PATENT OFFICE.

WESLEY H. SMITH, OF LITTLE ROCK, ARKANSAS.

STEERING MECHANISM FOR AUTOMOBILES.

Application filed January 16, 1925. Serial No. 2,861.

*To all whom it may concern:*

Be it known that I, WESLEY H. SMITH, a citizen of the United States of America, and resident of Little Rock, in the county of Pulaski and State of Arkansas, have invented certain new and useful Improvements in Steering Mechanism for Automobiles, of which the following is a specification.

This invention relates to steering mechanism for a well known type of automobile, and has for an object the provision of novel means for increasing the leverage of the steering mechanism of such automobile, preventing wabbling or so-called "shimmying" of the front wheels, and elimination of rattling noises from steering joints.

It is an object of this invention to produce a novel link or connecting rod between the steering post and the tie rod or connecting rod of such automobile, and to include in such an improvement means for absorbing shock and vibration due to uneven roadbeds, or the impact of the wheels when they encounter slight obstructions in travel.

It is a further object of this invention to produce an element in the steering mechanism of such automobile which can be readily substituted for those now in common use, in order that the advantages heretofore indicated may be attained.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of the front wheels and the steering mechanism of an automobile with a device embodying the invention applied thereto, partly in section;

Figure 2 illustrates an enlarged detail sectional view of the link and the joint between the link and the steering post of the automobile, the same being sectioned on the line 2—2 of Fig. 1; and Figure 3 illustrates a sectional view on the line 3—3 of Fig. 1 with the joint in section and the wheel omitted.

In these drawings, 5 denotes the usual tie or connecting rod of the automobile, which is provided with the usual socket 6 having a threaded shank or bolt 7 projecting through a fixture of the connecting or tie rod.

The usual steering post or arm 8 of the automobile has a ball 9 which fits in a socket of the link 10. The link, in this invention, has the end which receives the ball 9 recessed, as at 11, to form a seat for a ball and socket joint connection. The link has a hollow extension 12 with a flared end 13 which is recessed to form a half socket 14 for the ball. The link and extension have abutting flanges 15 which are secured together by fastenings 16, such as bolts or the like, in order that the extension and ball may be held in assembled relation with the link. The extension is further provided with a spring 17 and a threaded plug 18 which is intended to be adjusted in the extension 12 to increase or diminish the tension of the spring 17, it being shown that the said spring embraces a solid plug or pin 19, with flared flat surface end 20, which flat surface coincides with and which bears against an equal and corresponding flat side of the ball 9, which is also designated by the number 20, the pressure from this spring encased pin tending at all times to keep the surfaces of the pin and ball at 20 parallel and to prevent rotation of the ball out of that position.

The end of the link remote from the steering post is shaped to form a gooseneck 21 which is resilient, but not unduly so, it being the purpose of the inventor that the link shall be effective to strengthen and reciprocate the tie or connecting rod, while yielding to a slight extent, to cause the absorption of shock or vibration, as has been explained.

The gooseneck terminates in a ball 22 which fits in the socket 6 as the links on automobiles of the type indicated are now employed, so that as the steering wheel is manipulated, the steering post will impart motion to the link and it, in turn, will communicate motion to the tie or connecting rod.

In order that the gooseneck may be strong and yet relatively resilient that portion of the link that has the gooseneck formation is formed of flat metal as shown in Figure 3 of the drawing.

It will be seen from an inspection of the drawing that when the plug is threaded into the hollow extension 12, the tension of the spring will be increased and the pressure of the flat surface 20 of the pin 19 against the corresponding flat surface area 20 on the ball 9 may be made to produce satisfactory results without allowing undue motion, the tendency of the ball 9 thereby being at all times to remain in or return to its position as shown in Figure 2, and the relation of the ball 9 and adjustment of same in connection with the other parts of the steering apparatus being such that the front wheels of the automobile are lined to move straight forward when the ball 9 is in position with flat surface side against flat surface 20 of pin 19.

I claim:

1. In a steering link for automobiles, an element having a gooseneck formation in which there are parallel portions connected by a loop, means for connecting the said end of the element to a tie rod of an automobile, and means for connecting the said link to a steering post.

2. In a steering link for automobiles, a rod-like element having an integral gooseneck of greater resiliency than the remainder of the element, means for connecting the end of the gooseneck to a tie rod, substantially as described.

WESLEY H. SMITH.